April 9, 1940.    H. J. BRANDENBURG    2,196,851
PLANETARY TRANSVERSE FRUIT BRUSHER
Filed Feb. 18, 1938    2 Sheets-Sheet 1
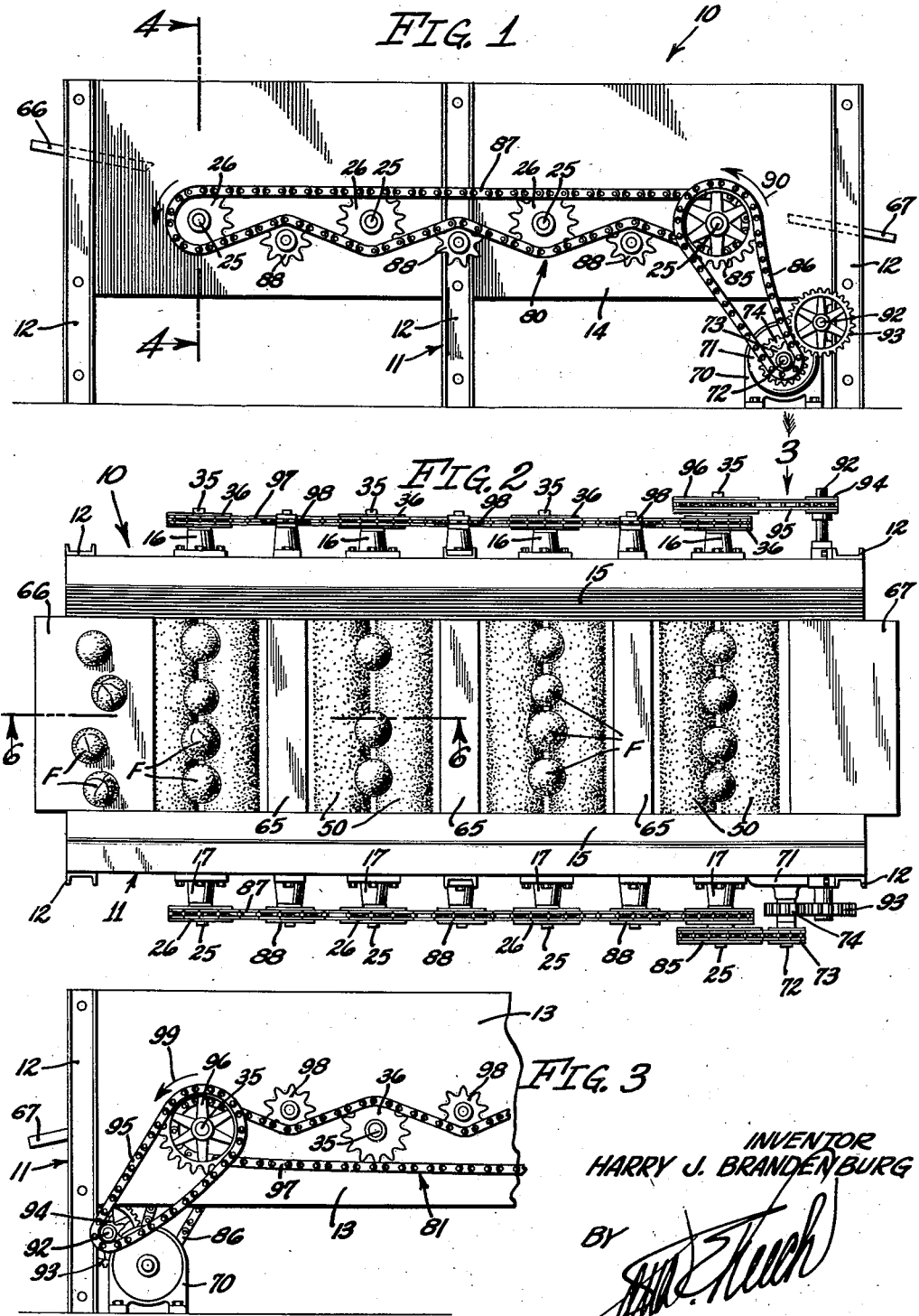

April 9, 1940.                H. J. BRANDENBURG                2,196,851
                    PLANETARY TRANSVERSE FRUIT BRUSHER
                        Filed Feb. 18, 1938            2 Sheets-Sheet 2
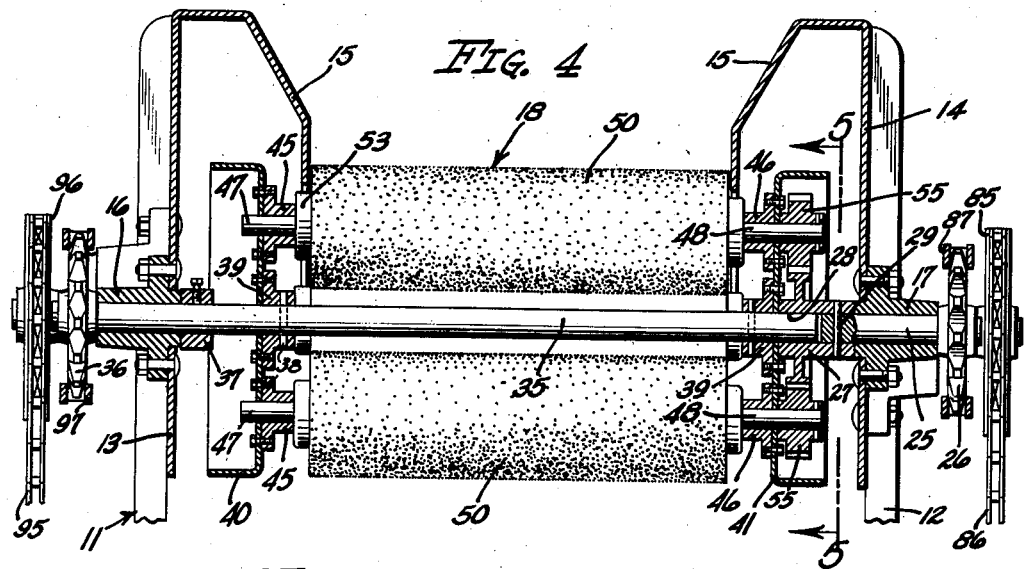
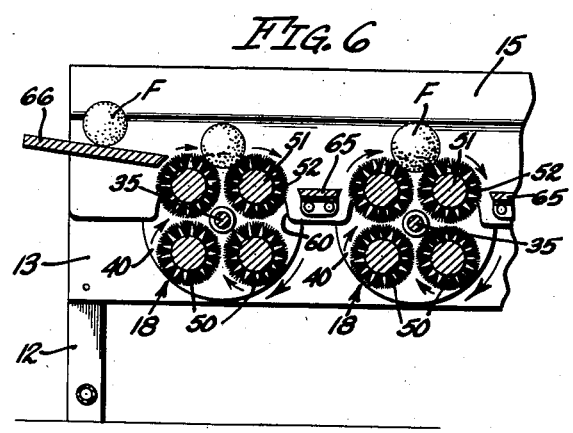
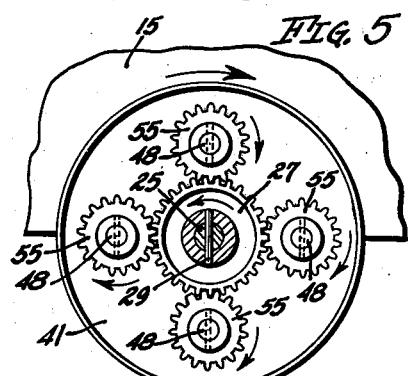
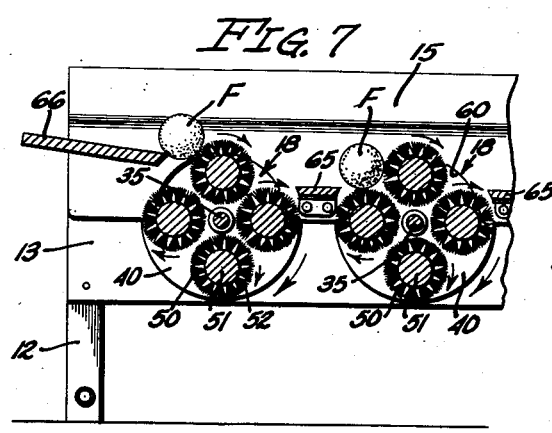
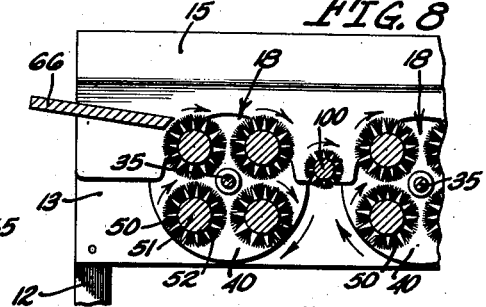
INVENTOR
HARRY J. BRANDENBURG
BY
ATTORNEY Patented Apr. 9, 1940

2,196,851

UNITED STATES PATENT OFFICE 2,196,851

PLANETARY TRANSVERSE FRUIT BRUSHER

Harry J. Brandenburg, Glendora, Calif., assignor of sixty-five per cent to F. E. Wood, W. G. Cartter, J. B. Seem, and W. J. Bailey, all of Monrovia, Calif.

Application February 18, 1938, Serial No. 191,278

9 Claims. (Cl. 146—202)

This device relates to rotating treating devices for rollable articles and has a special utility in the treatment of fresh fruits such as those packed in the citrus producing industry.

It is an object of my invention to provide an improved rotary device for treating rollable articles.

It is another object of my invention to provide such a device which is especially adaptable to treating fresh rollable fruits.

It is yet another object of my invention to provide such a device which accomplishes its treatment on the articles treated by a brushing action.

In the handling of rollable articles as in certain of the fresh fruit producing industries and particularly in the citrus producing industry, it has been found that the treating of these fruits in preparing these for shipment may be advantageously accomplished by machines which handle a relatively wide stream of fruit.

There are several treatments which are generally given fresh rollable fruits to prepare these for shipment, these including washing, drying and polishing treatments. It has been found advantageous to utilize brushes for accomplishing each of these treatments. The use of brushes in these treatments assures that the fruit will not be damaged and the handling of a broad stream of fruit in the accomplishing of each of the treatments permits a relatively small amount of equipment to handle a large volume of fruit.

The equipment in most general use at present for filling these requirements is called a transverse brusher, this comprising a series of substantially cylindrical brushes placed horizontally close to each other across the path of travel of fruit through the machine, these brushes being rotated rapidly in the same direction by a suitable power transmission. The fruit is then fed over these brushes from valley to valley either by the crowding action of fresh fruit introduced into the machine or by any of several types of clean-out devices, the latter periodically pushing the fruit across the brushes so as to insure that no fruit remains in the machine over a given maximum length of time.

It is a still further object of my invention to provide a novel and improved transverse brusher adapted for use in accomplishing the treatment of fresh rollable fruits above referred to.

The manner of accomplishing the foregoing objects as well as further objects and advantages will be made manifest in the following description taken in connection with the accompanying drawings in which:

Fig. 1 is a diagrammatic view of a side elevation of a preferred embodiment of my invention, this view illustrating the roller rotating transmission of my invention.

Fig. 2 is a plan view of said embodiment.

Fig. 3 is a fragmentary side elevational view of the opposite side of the device from that shown in Fig. 1 and illustrates the unit rotating transmission of the device.

Fig. 4 is an enlarged transverse sectional view of one of the rotating units of the invention and is taken on line 4—4 of Fig. 1.

Fig. 5 is a detailed longitudinal sectional view taken on line 5—5 of Fig. 4 and illustrates the gear mechanism included in the roller rotating power transmission.

Fig. 6 is a longitudinal vertical sectional view taken on line 6—6 of Fig. 2 and illustrates the co-operative relation of an adjacent pair of the rotating roller units of my invention.

Fig. 7 is a view similar to Fig. 6 but illustrating different positions of the adjacent units and the effect this has upon the travel of fruit thereover.

Fig. 8 is a view similar to Fig. 6 illustrating a modified form of my invention.

Referring specifically to the drawings, the embodiment of my invention illustrated therein comprises a transverse brusher 10 which includes a frame 11 having supporting posts 12 on which are secured side walls 13 and 14. Provided on the upper edges of the side walls 13 and 14 are fruit guarding aprons 15, the purpose of which will be made clear hereinafter.

Rotatably supported by bearings 16 and 17 provided on the walls 13 and 14 are a series of rotating roller units 18 which are constructed as follows:

Each unit 18 has a relatively short drive shaft 25 which journals in one of the bearings 17, this shaft carrying a driven sprocket 26 fixed upon its outer end and a drive gear 27 fixed upon its inner end, (see Fig. 4). The shaft 25 extends only partway into the bore 28 of the gear 27 and is united with this gear by a pin 29. Journalled in the bearing 16 and in the inner end of the bore 28 of the gear 27 is a main unit shaft 35, on the outer end of which is provided a driven sprocket 36 which, with a collar 37, fixes the shaft 35 against longitudinal movement.

Also fixed upon the shaft 35 as by pins 38 are hubbed flanges 39 on which are provided unit heads 40 and 41 which are preferably identical and which are located inside of the guard aprons 15.

The unit heads 40 and 41 are provided with aligned bearings 45 and 46 in which are journalled trunnions 47 and 48 provided on the opposite ends of treating rollers 50. In the preferred embodiment illustrated these rollers are shown as brush rollers each of which has a core 51 and bristles 52 mounted in holes in this core. The opposite ends of the core 51 have flanges 53 mounted thereon, these flanges carrying the trunnions 47 and 48, aforementioned.

The bristles 52 are preferably turned down to a substantially cylindrical shape and all the brushes 50 preferably are of the same diameter.

Fixed on the trunnions 48 and designed to mesh with the drive gear 27 are driven gears 55.

The guards 15 have arcuate recesses 60 which are formed about the axis of the units 18 so as to just miss the flanges 53 on the ends of the brush rollers 50. As shown in Figs. 6 and 7, the units 18 are placed relatively close together and in the space between each adjacent pair of these units is provided a transfer board 65, opposite ends of which are supported on the guards 15.

At the fruit receiving end of the brusher 10 is an inclined fruit feeding board 66 and at the discharge end of the machine an inclined fruit discharge board 67.

In operating the machine I preferably employ an electric motor 70 having a reducing gear box 71 through which the power of the motor is transmitted to a drive shaft 72 carrying a sprocket 73 and a pinion gear 74 (see Fig. 1). The shaft 72 produces a relatively rapid rotation of the rollers 50 through a roller rotating transmission 80 and also causes a relatively slow rotation of the units 18 through a unit rotating transmission 81 (see Fig. 3).

The transmission 80 includes a driven sprocket 85 which is fixed on the shaft 25 nearest the motor 70 and is disposed in the same plane and connected through a chain 86 with the pinion sprocket 73. The sprockets 26 on all the shafts 25 are connected together by an endless chain 87 which encircles these sprockets and is held in operative relation with all of them by idle sprockets 88 mounted on the side wall 14. The motor 70 rotates the sprocket 85 in the direction indicated by the arrow 90. This results in rotating all of the shafts 25 and drive gears 27 in the same direction thereby rotating all of the driven gears 55 and treating rollers 50 in the opposite direction.

The unit rotating transmission 81 includes a shaft 92 which is journalled in suitable bearings on the frame 11, this shaft having a gear 93 at one end which meshes with the drive pinion gear 74. The shaft 92 extends entirely through the machine and has a pinion sprocket 94 on its opposite end which is in the same plane as and connected by an endless chain 95 with a master sprocket 96 which is fixed upon the outer end of that shaft 35 which is nearest to the shaft 92.

All of the sprockets 36 are connected by an endless chain 97 which encircles these and is held in operative relation with them by idle sprockets 98 which are mounted on the side wall 13. As shown in Fig. 3, the chain 95 causes the sprocket 96 and all of the shafts 35 to rotate slowly in the direction indicated by the arrow 99.

By a study of Figs. 6 and 7, it will be seen that pieces of fruit or other rollable articles, fed into the machine 10 over the drop board 66, comes to rest in a valley formed between adjacent rollers 50 of the initial unit 18. As the rollers 50 of this unit are rotating rapidly in the direction indicated by arrows adjacent thereto, the fruit is caused to rotate in the opposite direction and is brushed by the bristles 52 of these rollers. The relatively slow rotation of the unit, however, eventually results in the fruit thus held being deposited upon the transfer board 65 disposed between this unit and the next unit 18.

The fruit thus deposited rolls across this board and into a valley between adjacent rotating brushes 50 which are rising incidental to the rotation of the next unit 18. Fruit thus transferred to the second unit 18 is brushed thereby and in the same manner transferred to the third unit and so on until the fruit passes from the last unit 18 of the machine onto the discharge drop board 67 over which it gravitates out of the machine onto a conveyor provided for receiving it or into another treating machine disposed adjacent to the machine 10.

In Fig. 8 I have shown a modified form of my invention in which a brush 100 is substituted for the transfer board 65, this brush being preferably rotated in the direction of the arrow adjacent thereto by a suitable sprocket (not shown) which may be driven from one of the chains 87 or 97.

The fruit passing from one unit 18 rolls over the brush 100 into a valley between adjacent rollers 50 of the next unit in substantially the same manner as this fruit rolls over the drop board 65. Owing to the fact that the brush 100 has bristles substantially like the brush rollers 50, an additional brushing action is given the fruit by the use of the transfer rollers 100 in place of the drop boards 65.

While I have shown the preferred embodiment of my invention and the modification thereof illustrated in the drawings, with the axes of rotation of the units thereof lying substantially in a horizontal plane, it is to be understood that in some cases it may be preferable to mount these units with their axes lying in an inclined plane so that the fruit in traveling through the machine travels down hill. This might be accomplished in the machine 10, for instance, by mounting this so that the left hand end, as shown in Fig. 1, is disposed higher than the right hand end so that the side walls 13 and 14 are inclined downwardly toward the discharge end of the brusher. Such an inclination tends to increase the positiveness of transfer of fruit from each of the transfer board 65 into rising troughs between pairs of rollers 50 of the unit 18 immediately in advance of that transfer board.

Wherever the travel of a given type of rollable article through the machine 10, with the latter disposed horizontally, is not sufficiently positive, therefore, the machine may be inclined downwardly from the intake to the discharge end thereof so as to facilitate the positive travel of these articles through the machine.

What I claim is:

1. In an apparatus for brushing fruit, having a receiving end and a discharge end, the combination of: a supporting frame extending longitudinally from the receiving end to the discharge end, a series of brush units rotatably mounted transversely in the frame, each brush unit comprising a plurality of rotatable brushes with axes parallel to the axis of the unit and eccentric thereof; means to rotate the individual brushes to brush fruit introduced to the upper external surfaces of the units, and a transverse member mounted in the frame between the brush units to aid in supporting the fruit between the brush units.

2. In an apparatus for brushing fruit, having a receiving end and a discharge end, the combination of: a supporting frame extending longitudinally from the receiving end to the discharge end, a series of brush units rotatably mounted transversely in the frame, each brush unit comprising a plurality of rotatable brushes with axes parallel to the axis of the unit and eccentric thereof, means to rotate the individual brushes to brush fruit introduced to the upper external surfaces of the units, and a transverse brush mounted in the frame between the brush units to aid in supporting the fruit between the brush units.

3. In an apparatus for brushing fruit, having a receiving end and a discharge end, the combination of: a supporting frame extending longitudinally from the receiving end to the discharge end, a series of brush units rotatably mounted transversely in the frame, each brush unit comprising a plurality of rotatable brushes with axes parallel to the axis of the unit and eccentric thereof, means to rotate the individual brushes to brush fruit introduced to the upper external surface of the units, a transverse brush rotatably mounted in the frame between the brush units to aid in supporting and moving the fruit between the brush units, and means to rotate the transverse brush.

4. In a machine for treating rollable articles, the combination of: a plurality of roller units placed side by side, each comprising a pair of heads pivotally mounted upon a given axis and a plurality of treating rollers rotatably mounted upon said heads eccentric of said axis and symmetrically disposed thereabout; means for continuously and relatively slowly rotating said units; and means for relatively rapidly rotating said rollers, said units being disposed to support, convey transversely of the axes of said units and frictionally treat rollable articles resting thereupon, adjacent pairs of said units being provided with means for supporting and assisting in the transfer of articles passing from one unit to the other of said pair.

5. In a machine for treating rollable articles, the combination of: a plurality of roller units placed side by side, each comprising a pair of heads pivotally mounted upon a given axis and a plurality of treating rollers rotatably mounted upon said heads eccentric of said axis and symmetrically disposed thereabout; means for continuously and relatively slowly rotating said units; and means for relatively rapidly rotating said rollers, said units being disposed to support, convey transversely of the axes of said units and frictionally treat rollable articles resting thereupon; adjacent pairs of said units having roller means disposed between the units of said pairs for supporting and assisting in the transfer of articles passing from one unit to another of said pair.

6. In a machine for treating rollable articles, the combination of: a pair of roller units each comprising a pair of heads pivotally mounted on a given axis and a plurality of treating rollers rotatably mounted upon said heads eccentric of said axis and symmetrically disposed thereabout; means for continuously and relatively slowly rotating said units; means for relatively rapidly rotating said rollers, said units being disposed to support and frictionally treat rollable articles resting thereupon; and a power driven roller disposed in the space between said units and rotating in the same direction as said units for assisting in the transfer of articles from one of said units to another of said units.

7. An apparatus for brushing fruit comprising: a frame, a brush support rotatably mounted on the frame, a plurality of circular brushes mounted for individual rotation on the brush support spaced in close proximity concentrically around the axis of the brush support and adapted to support fruit in the depressions between the external surfaces of those adjacent brushes which are in the upper half of the rotary path of the brush support, means to slowly rotate the brush support, and means to rapidly rotate the individual brushes, to brush the fruit and convey same in the direction of rotation of the brush support.

8. An apparatus for brushing fruit comprising: a frame, brush supporting means rotatably mounted on the frame, a plurality of circular brushes mounted for individual rotation on the brush supporting means concentric about the axis thereof and adjacent brushes being spaced sufficiently close together to prevent fruit being treated from falling therebetween and providing a surface of V cross section for receiving and temporarily supporting the fruit on the external surface portions of the brushes above a horizontal line through the axis of the brush supporting means, means to rotate the brush supporting means, and means to individually rotate the brushes at the same time that the brush supporting means is rotating to brush fruit and simultaneously convey it transversely of the brushes.

9. An apparatus for brushing fruit comprising: a series of brushing and conveying units each consisting of a rotatable brush support, a plurality of rotary brushes mounted for individual rotation on the brush support eccentric of the axis thereof and being circumferentially spaced close enough together to provide fruit supporting and conveying depressions between adjacent brushes on the upper external surface of the brushes when in the upper half of the rotary path of the unit, means to rotate the units, and means to individually rotate the brushes of the units, whereby fruit is brushed and conveyed from one unit to another for successive treatment.

HARRY J. BRANDENBURG.